UNITED STATES PATENT OFFICE.

W. S. HUBBELL AND A. BARRETT, OF KINGSVILLE, OHIO.

IMPROVEMENT IN COMPOSITIONS FOR TREATING WOOL.

Specification forming part of Letters Patent No. 9,764, dated June 7, 1853.

*To all whom it may concern:*

Be it known that we, WILLIAM S. HUBBELL and AMOS BARRETT, of Kingsville, in the county of Ashtabula and State of Ohio, have invented a new and useful improvement of a composition for the treatment of wool to prepare and fit it for the different manufacturing operations to produce woolen and worsted fabrics; and we do hereby declare that the following is a full, clear, and exact description of the same.

The nature of our invention consists in employing a composition for the treatment of wool to fit it for its separate and several manufacturing operations, which composition consists of oil and alcohol, or an alcholic liquor.

To enable others skilled in the art to make and use our invention, we will proceed to describe the mode of making and using it, so as to present an account of the difference between our composition and that which has been heretofore used for the same purpose.

In the common way of treating wool for manufacturing purposes it is washed before it is fit for the combing operation. After it (the wool) is washed and dried it is treated with oil, which is generally sprinkled or rubbed into it.

It has been found necessary to treat wool with an unctuous agent to enable its fibers to draw out, roll, twist, and weave, and for this purpose various oils have been employed in different countries from time immemorial. A cheap substitute for oil has been a desirable object. Steam and water have been tried; but moisture of water is not a good substitute for oil.

Instead of using oil alone as an unctuous agent, we have discovered that it is a great improvement to employ a composition of oil and alcohol. This composition is made by taking two-thirds, by measure, (according to the quantity required,) of oil, and one-third, by measure, of alcohol, and stirring them well together in a proper vessel and applying them to the wool in the same manner that oil is now applied, and for the same purpose. The operation of applying it, therefore, does not require to be further described. The wool to which this composition is applied does not require to be washed previously.

In all wool there is a greasy glutinous substance which has to be removed by washing. The alcohol in our composition acts upon this greasy glutinous matter and softens it, thereby rendering the wool much freer to work in all the various stages of its manufacture, from the raw state to its finish in cloth.

We have employed this composition for about six months in our factory, and we have found that one gallon of it answers for as much wool as that for which one and one-fourth gallons of oil are now employed. It has worked to our entire satisfaction. It enables us to spin a finer thread, to weave cloth easier, the cloth scours much better, is softer to the feel, and appears more beautiful than cloth made from wool treated with oil.

We do not confine ourselves to the exact quantity of alcohol and oil; but the quantities we have given work very well. We also do not confine ourselves to the use of pure alcohol, but to alcohol or alcoholic liquors. The pure alcohol, however, if it can be obtained, is to be preferred to any of its mixtures for commercial purposes.

Having thus explained our invention, we claim—

The treating of wool with a composition of oil and alcohol to prepare and fit it for the several manufacturing operations for which oil has been and is now employed.

WM. S. HUBBELL.
AMOS BARRETT.

Witnesses:
  H. G. THURBER,
  CALVIN LUCE.